United States Patent
Sakashita et al.

(10) Patent No.: US 12,363,615 B2
(45) Date of Patent: Jul. 15, 2025

(54) COMMUNICATION POINT DETERMINATION DEVICE, COMMUNICATION POINT DETERMINATION METHOD AND PROGRAM, AND INSPECTION SYSTEM

(71) Applicant: MITSUBISHI HEAVY INDUSTRIES, LTD., Tokyo (JP)

(72) Inventors: Gen Sakashita, Tokyo (JP); Masaki Honda, Tokyo (JP); Shigeru Yoshida, Tokyo (JP); Ryo Hashimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 434 days.

(21) Appl. No.: 17/799,579

(22) PCT Filed: Jan. 7, 2021

(86) PCT No.: PCT/JP2021/000282
§ 371 (c)(1),
(2) Date: Aug. 12, 2022

(87) PCT Pub. No.: WO2021/171792
PCT Pub. Date: Sep. 2, 2021

(65) Prior Publication Data
US 2023/0067775 A1    Mar. 2, 2023

(30) Foreign Application Priority Data
Feb. 27, 2020 (JP) .................. 2020-031433

(51) Int. Cl.
*H04W 4/00* (2018.01)
*H04W 4/70* (2018.01)
(Continued)

(52) U.S. Cl.
CPC ............ *H04W 48/04* (2013.01); *H04W 4/70* (2018.02); *H04W 4/80* (2018.02)

(58) Field of Classification Search
CPC .......... H04W 48/04; H04W 4/70; H04W 4/80
(Continued)

(56) References Cited

U.S. PATENT DOCUMENTS

2009/0021351 A1    1/2009    Beniyama et al.
2019/0084161 A1    3/2019    Tokuhashi et al.
(Continued)

FOREIGN PATENT DOCUMENTS

JP    6-198586 A    7/1994
JP    2003-130695 A    5/2003
(Continued)

OTHER PUBLICATIONS

International Preliminary Report on Patentability and Written Opinion of the International Searching Authority for International Application No. PCT/JP2021/000282, dated Sep. 9, 2022, with an English translation.
(Continued)

*Primary Examiner* — Temica M Beamer
(74) *Attorney, Agent, or Firm* — Birch, Stewart, Kolasch & Birch, LLP

(57) ABSTRACT

A communication point determination device for determining a communication point including a communication position being a position of a mobile body which performs close-range wireless communication with a wireless device disposed within a target area including an obstacle which obstructs propagation of radio waves includes: a first acquisition part configured to obtain a radio wave strength map indicating a distribution of a radio wave strength within the target area obtained by numerical analysis based on area shape information of the target area generated on the basis
(Continued)

of an outer shape of the obstacle existing within the target area, installation position information of the wireless device within the target area, and radio wave information related to transmission or response of radio waves of the wireless device; and a determination part configured to determine the communication point on the basis of the radio wave strength map.

10 Claims, 6 Drawing Sheets

(51) Int. Cl.
  *H04W 4/80* (2018.01)
  *H04W 48/04* (2009.01)
(58) Field of Classification Search
  USPC .......................................... 455/435.2
  See application file for complete search history.

(56) References Cited

U.S. PATENT DOCUMENTS

| | | |
|---|---|---|
| 2020/0127747 A1 | 4/2020 | Hamabe |
| 2022/0066456 A1* | 3/2022 | Ebrahimi Afrouzi ........................ G06F 3/04883 |

FOREIGN PATENT DOCUMENTS

| | | |
|---|---|---|
| JP | 3764713 B2 | 4/2006 |
| JP | 2009-23740 A | 2/2009 |
| JP | 2010-189422 A | 8/2010 |
| JP | 2013-52462 A | 3/2013 |
| JP | 2019-54409 A | 4/2019 |
| WO | WO 2019/004243 A1 | 1/2019 |

OTHER PUBLICATIONS

International Search Report for International Application No. PCT/JP2021/000282, dated Feb. 16, 2021.

\* cited by examiner

COMMUNICATION POINT DETERMINATION DEVICE, COMMUNICATION POINT DETERMINATION METHOD AND PROGRAM, AND INSPECTION SYSTEM

TECHNICAL FIELD

The present disclosure relates to a technology to determine a communication point for close-range wireless communication with an installed wireless device.

The present application claims priority based on Japanese Patent Application No. 2020-31433 filed on Feb. 27, 2020, the contents of which are incorporated herein by reference.

BACKGROUND ART

For instance, patrol inspection of a plant such as a thermal plant includes various works such as examination by touch, reading meters such as an analog meter, detection of abnormal noise, checking steam leakage, and the like. The above works need to be carried out several times each day in shifts. When performed by patrol workers (people), there is a problem of increased inspection cost and shortage of personnel, for instance. Thus, a techniques have been proposed to inspect presence and absence of abnormality of a plant facility using a remote-control type mobile cart or the like equipped with sensors for inspection and monitoring instead of a patrol worker. For instance, Patent Document 1 discloses a mobile robot which is equipped with a plurality of kinds of sensors for inspection and monitoring, a battery, a wireless transmitter, and configured to be moved to an inspection target by remote control to perform inspection. Patent Document 2 discloses a maintenance-and-inspection robot of a bipedal or vehicle type which reads in information from IC tags arranged along a route of maintenance and inspection work for a plant and operates in accordance with the work directions obtained from the information.

Furthermore, Patent Document 3 discloses a system which includes a fixed sensor terminal disposed in a fixed manner in a factory or the like to measure environmental information such as temperature, moisture, and brightness, and a self-propelled sensor terminal which travels within the space to measure the above environmental information as well as the environmental information of an environment which cannot be measured by the fixed sensor terminal. Accordingly, by installing the fixed sensor terminal at a location where it is necessary to take measurements on a more frequent cycle than other measurement points, and taking measurements at measurement points where the frequent cycle is not required with the self-propelled sensor terminal, it is possible to measure the environment efficiently with a fewer terminals without installing fixed sensors for every location. Furthermore, the document also discloses that it is possible to reliably carry out communication between sensor terminals in an area broader than the service range of radio waves by using the self-propelled sensor terminal or the fixed sensor terminal positioned in the middle as a relay for communication in a case where the radio waves of wireless communication do not reach directly,

CITATION LIST

Patent Literature

Patent Document 1: JPH6-198586A
Patent Document 2: JP3764713B
Patent Document 3: JP2010-169422A

SUMMARY

Problems to be Solved

However, the following problem is present in a case where patrol inspection is taken over by ground-based robots as in Patent Documents 1 and 2. That is, it is difficult to inspect positions that the ground-based robots cannot reach, or that are blind from the ground-based robots, such as heights and upper surfaces of a pipe, for instance. In a case where the examination by touch is taken over by a robot, the necessity to provide a high-performance manipulator increases the cost of the robot, and the range that a manipulator can inspect is limited. In a case where the meter reading work is taken over by a robot, it is necessary to take an image of a meter with a camera mounted to the robot, which requires precise position matching between the robot and the camera, and makes the control difficult. Furthermore, in a case where inspection points are identified on the basis of the position information of the robot to associate the inspection point with inspection results for management and there are more than one inspection points positioned proximate to one another, there is a risk of wrongly identifying an inspection point with an inspection result depending on the position estimation accuracy of the robot (see FIG. 1).

To solve the above problems, one may consider applying the wireless communication technology as described in Patent Document 3. In this case, it may take time to take measurements due to the physical amounts to be measured, or it may be difficult to take measurements. Also, in a case where sensors are already provided, it may be desirable to adopt a system that utilizes the existing sensors. In such a case, one may consider a system in which a mobile body travels and collects measurement results of fixed sensors. However, an area to be patrolled such as a plant normally includes obstacles that hinder propagation of radio waves, such as buildings, apparatuses, and temporarily placed goods. Also, the battery mounted to the mobile body only has a limited power capacity. Thus, if the mobile body needs to travel while looking for a position (communication point) where it is possible to communicate with fixed sensors without being interfered by the above obstacles, the time required for patrol inspection may become longer. Furthermore, an inspection worker needs to visit the site when the battery runs out while in motion, for instance, which leads to a cost increase.

In view of the above, an object of at least one embodiment of the present invention is to provide a communication point determination device capable of efficiently performing patrol inspection by a mobile body within a target area such as a plant.

Solution to the Problems

According to at least one embodiment of the present invention, a communication point determination device for determining a communication point including a communication position being a position of a mobile body which performs close-range wireless communication with a wireless device disposed within a target area including an obstacle which obstructs propagation of radio waves includes: a first acquisition part configured to obtain a radio wave strength map indicating a distribution of a radio wave strength within the target area obtained by numerical analysis based on area shape information of the target area generated on the basis of an outer shape of the obstacle existing within the target area, installation position information of the wireless device within the target area, and radio wave information related to transmission or response of radio waves of the wireless device; and a determination part configured to determine the communication point on the basis of the radio wave strength map.

According to at least one embodiment of the present invention, an inspection system includes: the above communication point determination device; and a mobile body including an on-board wireless device for performing the close-range wireless communication with the wireless device, the mobile body being configured to travel along a patrol route which passes through the determined communication position.

According to at least one embodiment of the present invention, a method for determining a communication point which includes a communication position being a position of a mobile body which performs close-range wireless communication with a wireless device disposed within a target area including an obstacle which obstructs propagation of radio waves includes: a step of obtaining a radio wave strength map indicating a distribution of a radio wave strength within the target area obtained by numerical analysis based on area shape information of the target area generated on the basis of an outer shape of the obstacle existing within the target area, installation position information of the wireless device within the target area, and radio wave information related to transmission or response of radio waves of the wireless device; and a step of determining the communication point on the basis of the radio wave strength map.

According to at least one embodiment of the present invention, a program for determining a communication point including a communication position being a position of a mobile body which performs close-range wireless communication with a wireless device disposed within a target area including an obstacle which obstructs propagation of radio waves is configured to cause a computer to realize: a first acquisition part configured to obtain a radio wave strength map indicating a distribution of a radio wave strength within the target area obtained by numerical analysis based on area shape information of the target area generated on the basis of an outer shape of the obstacle existing within the target area, installation position information of the wireless device within the target area, and radio wave information related to transmission or response of radio waves of the wireless device; and a determination part configured to determine the communication point on the basis of the radio wave strength map.

Advantageous Effects

According to at least one embodiment of the present invention, it is possible to provide a communication point determination device capable of efficiently performing patrol inspection by a mobile body within a target area such as a plant.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Explanation of Inspection System)

Figure 1:
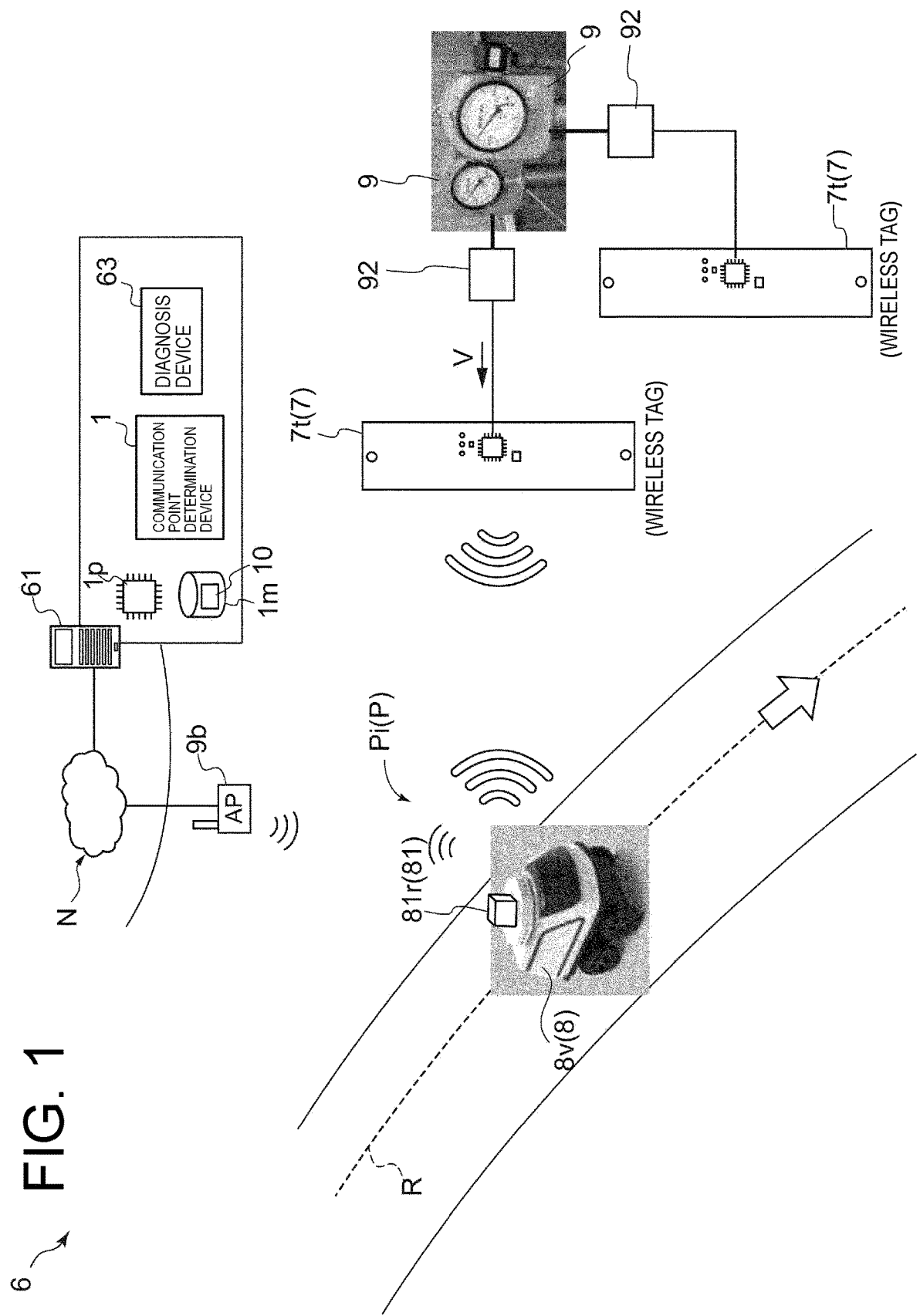
FIG. 1 is a schematic configuration diagram of an inspection system according to an embodiment of the present invention.

FIG. 1 is a schematic diagram of an inspection system 6 according to an embodiment of the present invention.

As depicted in FIG. 1, the inspection system is a system for performing inspection (patrol inspection) on an area to be inspected such as a plant (hereinafter, a target area). The inspection system 6 includes a communication point determination device 1 which determines a communication point P including a communication position Pi being a position (location) of a mobile body which carries out close-range wireless communication with (tries to connect with) a wireless device 7 installed in a target area including an obstacle that obstructs propagation of radio waves, and a mobile body 8 which includes a wireless device for carrying out the close-range wireless communication with the wireless device 7 (hereinafter, an on-board wireless device 81) and which moves along a patrol route R that passes through the determined communication position Pi.

The above wireless device 7 is a device connected to a device installed in a fixed manner within the target area, for communicating communication data V obtained from the device to outside. In the embodiment depicted in FIG. 1, the wireless device 7 is connected to various sensors 9 which are capable of detecting (measuring) a desired physical quantity, and is capable of sending detection results of the sensors 9 to outside as communication data V. Normally, inside the plant, a variety of sensors 9 are disposed on necessary locations to obtain physical quantities such as temperature, vibration, flow rate, abnormal noise, etc., of a target facility such as a pipe, and a plurality of sensors 9 are arranged in a dispersed manner within the target area. Thus, a plurality of wireless devices 7 are disposed in conformity to the installation positions of the respective sensors 9. For instance, a single wireless device 7 may be provided for a single sensor 9, or a single wireless device 7 may be provided for a plurality of sensors 9 that are positioned proximately. While the sensor 9 illustrated in FIG. 1 is an analog meter, the wireless device 7 in the present embodiment is connected to the sensor 9 via a converter 92 which is capable of outputting data corresponding to analog values detected by the sensor 9. The sensor 9 may be a camera installed to capture an image of a display part of a meter, or a thermal image, for instance. The wireless device 7 may be built into the sensor 9.

Furthermore, the above close-range wireless communication performed between the wireless device 7 and the on-board wireless device 81 may be, for instance, Radio Frequency Identifier (RFID), infrared communication, Bluetooth (registered trademark) or wireless LAN (Wi-Fi). In the embodiment depicted in FIG. 1, the wireless device 7 is an RFID tag such as an IC tag which is capable of communication using the RFID communication principle (hereinafter, a wireless tag 7t). The above on-board wireless device 81 is an RFID reader/writer. Furthermore, the wireless tag 7t generates electric power on the basis of radio waves or magnetic fields (hereinafter, radio waves or the like) received from the on-board wireless device 81 with a built-in antenna, and operates (starts) with the generated electric power, while returning the above communication data V obtained as a result of the above operation to the on-board wireless device 81 from the above antenna or the like. Furthermore, the wireless tag 7t is connected to only one of the sensors 9, and is attached to the housing of the sensor 9 or a facility close to the sensor 9 so as to be disposed in the vicinity of the sensor 9.

Furthermore, identification information of the wireless device 7 itself (tag ID of the wireless tag 7t, for instance) may be included in the communication data V sent from the wireless device 7. In this way, it is possible to associate the communication data V with the wireless device 7 in advance, and thus it is possible to prevent the communication data V from being identified incorrectly as that of another wireless device 7 even in a case where a plurality of wireless devices 7 are disposed proximately (see FIG. 1).

The above described mobile body 8 is configured to be capable of moving along the patrol route R in order to collect the communication data V from the above described wireless device 7. It is possible to determine the communication points P and the patrol order thereof from the patrol route R. The patrol route R may have one or more communication points P. Normally, more than one communication points P are provided in a plant. The mobile body 8 may be a ground-based robot for maintenance and inspection such as an unmanned grand vehicle (UGV) (see FIG. 1), or an air-based robot for maintenance and inspection such as an unmanned aerial vehicle (UAV) like a drone. Alternatively, the mobile body 8 may be a vehicle that carries people.

More specifically, the mobile body 8 moves along the patrol route R by the movement control of the control device 61 disposed on the mobile body 8 or outside the mobile body 8. The control device 61 may be configured to accumulate and manage the communication data V sent from the mobile body 8. Specifically, in some embodiments, the above movement control may be performed automatically on the basis of map information whereby it is possible to determine the patrol route R and the current position of the mobile body 8 obtained by using the self-position estimation unit mounted to the mobile body 8. In some other embodiments, the above movement control may be performed by commanding the mobile body 8 orientation or speed, for instance, in accordance with remote control by an operator or the like. In this case, the mobile body 8 may be equipped with a ranging sensor such as a depth camera and a light detecting and ranging (LiDAR) or a visible-light camera, for instance, such that the surrounding environment is sent to the control device 61 or the like. The mobile body 8 may be navigated by an operator while the operator checks the surrounding environment of the mobile body 8 through a monitor at a remote site and refers, for instance, to the current position or the map information described above. In some other embodiments, the above embodiments may be combined, and the control may be switchable between automatic control and manual control.

The above self-position estimation unit may be a known unit such as a global navigation satellite system (GNSS), an autonomous navigation device based on the direction and distance detected by the sensor mounted to the mobile body 8, and a LiDAR. Furthermore, the above map information may be generated through simultaneous localization and mapping (SLAM) using a LiDAR or the like, by moving the mobile body 8 within the target area.

Furthermore, the above communication point P is determined at least by the communication position Pi being a position (coordinate) in the target area. The communication point P may be determined by the orientation of the on-board wireless device 81 (the transmitting direction of radio waves or the like) as well. Specifically, the communication point P may include at least one information of the attitude of the mobile body 8, the position of the on-board wireless device 81 of the mobile body 8 or the direction and orientation of the antenna, the attitude of the antenna of the on-board wireless device 81 or the orientation of the antenna. The attitude of the mobile body 8 and the antenna may be determined (specified) by pitch, roll, or yaw. Furthermore, the orientation may be determined (specified) by the horizontal angle of the perpendicular angle. Each communication point P becomes the other communication point P if any one of the information included thereof is different. The mobile body 8 has a mechanism that is able to control a state on the basis of each information specifying the above communication point P, and thus is capable of close-range wireless communication at the determined communication point P. A plurality of antennae may be mounted to the mobile body 8, in which case the antennae may be configured such that the orientation of each antenna is individually adjustable.

In the embodiment depicted in FIG. 1, the control device 61 is a computer device, disposed outside the mobile body 8 and connected to a communication network N such as LAN and WAN and configured to communicate with the mobile body 8 via a base station 9b. The above base station 9b may be, for instance, a wireless base unit (wireless AP) of the wireless LAN (Wi-Fi), or a base station 9b of a mobile body communication system (4G, 5G). That is, it is sufficient if the mobile body 8 is capable of wireless communication with the control device 61 via the base station 9b while traveling within the target area, and if the communication range is longer than the close-range wireless communication between the on-board wireless device 81 and the wireless device 7.

In the embodiment depicted in FIG. 1, the mobile body 8 is an UGV 8v that travels powered by electric power of a built-in battery, and is configured to send the current position to the control device 61 periodically. Furthermore, the control device 61 has the above map information, and controls movement of the mobile body 8 while checking if the received current position is along the patrol route R. Specifically, the control device 61 may send (command) the next destination (a communication position or a position midway to a communication position) to the mobile body 8, and then track the current position of the mobile body 8 traveling toward the sent destination. By repeating this, the mobile body 8 is enabled to move along the patrol route R. Furthermore, the mobile body 8 is configured to send an inspection result obtained at each communication point P to the control device 61, and the control device 61 is configured to accumulate the received inspection results.

However, the present invention is not limited to the present embodiment. In some other embodiments, the mobile body 8 may possess the map information, by storing the map information in a storage device mounted to the mobile body 8, for instance, such that the mobile body 8 travels autonomously. In this case, the functions of the control device 61 may be dispersedly provided outside the mobile body 8 so as to enable monitoring of the communicated current position of the mobile body 8 and switching to remote control if needed. In some other embodiments, the inspection system 6 may not necessarily include a control device 61. In this case, the mobile body 8 travels autonomously and accumulates (stores) the entire inspection results, such that an inspection personnel or the like collects the accumulated inspection results at a predetermined place such as a hangar (not depicted).

That is, in the above described inspection system 6, the communication data V of the wireless device 7 is transmitted to outside only when the mobile body 8 is within the range where the radio waves or the like for close-range wireless communication from the on-board wireless device 81 traveling with the mobile body 8 are receivable by the wireless device 7. Furthermore, since close-range wireless communication is used for the transmission, it is possible to reduce the risk of data leakage due to interception or the risk of interference of radio waves or the like between the wireless devices 7. The shorter the wireless communication range of the technology (standard), the smaller the above risks.

Herein, in the above described inspection system 6, in order to collect the communication data V (detection results of the sensors in FIG. 1) from the at least one (more than one in FIG. 1) wireless device 7 installed fixedly in the target area, the mobile body 8 needs to approach each wireless device 7 up to a distance within the range of close-range wireless communication. However, if there is an obstacle B which obstructs (interrupts) propagation of radio waves for close-range wireless communication such as a fixture like a building or a device or temporarily placed goods within the target area, communication may be unavailable even within the communicable range. In particular, goods may appear abruptly at a point of time, and thus the communication may become unavailable even at a communication position Pi that has a successful history of communication with the wireless device 7 in the past.

In such a situation, it is necessary to repeat attempts to communicate while moving the mobile body 8 to find a new communication point P where it is possible to communicate with the wireless device 7, or relinquish collection of communication data from the specific wireless device 7. Furthermore, for instance, in the former case, the mobile body 8 searches for a new communication position Pi while traveling repeatedly, and thus the inspection may take longer. Also, the battery of the mobile body 8 is used for the search, which increases the risk of exhaustion of the battery while traveling along the patrol route R.

Thus, by using the above communication point determination device 1, the communication points P corresponding to the respective wireless devices 7 are determined in advance taking into account the obstacle B that exists in the target area.

Hereinafter, the communication point determination device 1 will be described in detail with reference to FIGS. 2 to 4.

Figure 2:
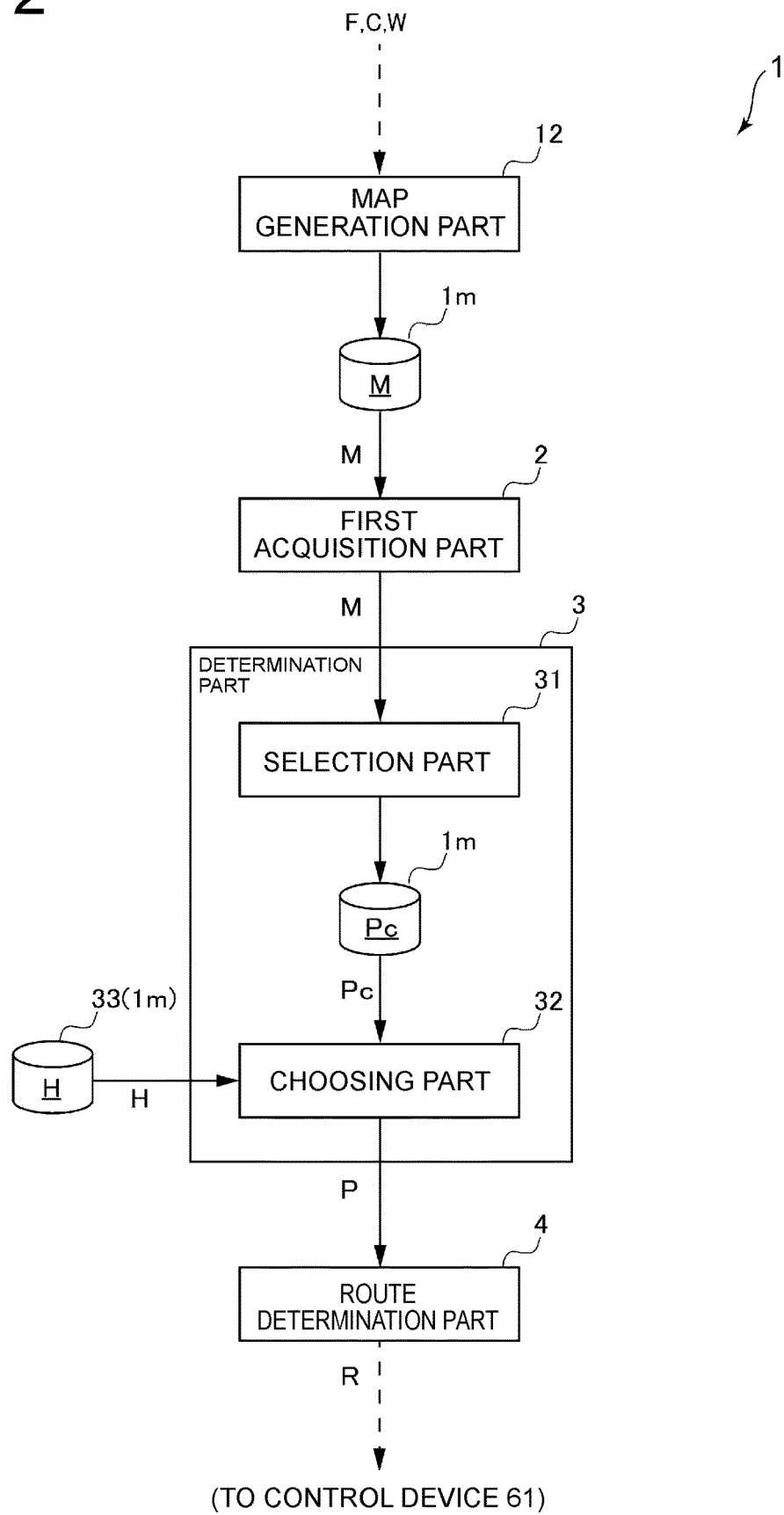
FIG. 2 is a schematic block diagram showing the functions of a communication point determination device according to an embodiment of the present invention.

FIG. 2 is a schematic block diagram showing the functions of the communication point determination device 1 according to an embodiment of the present invention. FIG. 3 is a diagram illustrating an image of the radio wave strength map M of a target area according to an embodiment of the present invention.

The communication point determination device 1 is a device configured to determine a communication point P corresponding to a wireless device 7 disposed in a target area including the above described obstacle B. In a case where a plurality of wireless devices 7 are disposed in the target area, the communication point determination device 1 determines a plurality of communication points P for wireless communication with the respective wireless devices 7. Furthermore, as depicted in FIG. 2, the communication point determination device 1 includes the first acquisition part 2 and a determination part 3. The above functional parts will be described with reference to an exemplary case where the target area is at least a partial region of a plant and the wireless device 7 is connected to the sensor 9.

The communication point determination device 1 may include a computer. That is, the communication point determination device 1 may include, though not depicted, a processor 1p (e.g., CPU) and a storage part 1m such as ROM and RAM, and realize each of the above functional parts through operation of the processor (e.g., computation of data) in accordance with commands of a program (communication point determination program 10) loaded to a memory (main storage device). In other words, the above program is a software for causing the computer to realize the respective functional parts described below, and may be stored in a storage medium that is readable by a computer.

The first acquisition part 2 is a functional part configured to obtain the radio wave strength map M showing the distribution of the radio wave strength in the target area. The radio wave strength map M is obtained from numerical analysis of area shape information F indicating the 2D or 3D shape of the target area generated on the basis of the outer shape of the obstacle B, information on the installation position of the wireless device 7 in the target area (hereinafter, installation position information C), and information on transmission or response of the radio waves of the wireless device 7 (hereinafter, radio wave information W). While at least one wireless device 7 is disposed in the target area, in a case where a plurality of wireless devices 7a are provided, the radio wave strength map M is calculated on the basis of the installation position and the radio wave information W of all of the wireless devices 7.

More specifically, the above area shape information F (e.g., 3D map) may be generated on the basis of a map indicating fixtures that are basically not moved such as a building standing on the ground within the target area or a plan of the building. Alternatively, the area shape information F may be generated on the basis of information obtained by detecting (measuring) the obstacle B in the surrounding area using a ranging sensor while actually traveling within the target area.

The above installation position information C indicates at which position the wireless device 7 is installed within the target area, and may be a collection of coordinates of the installation positions of the respective wireless devices 7. The coordinates may be specified by longitude and latitude, or by longitude, latitude, and altitude, or may be 2D or 3D positions from a reference position arbitrarily defined within the target area. The installation position of the sensor 9 may be regarded and treated as the installation position of the wireless device 7. The accuracy of the radio wave strength map M improves as the wireless device 7 is disposed closer to the sensor 9.

Furthermore, the above radio wave information W is information for estimating the reach of the radio waves of each wireless device 7 in a case where the obstacle B is not present, and the distribution of the radio waves strength within the reach, and may include, for instance, the radio wave transmission output of each wireless device 7, and in addition, the antenna polarization characteristics such as the presence or absence of orientation and how much communication gain is present in which direction, for instance.

Furthermore, the radio wave strength map M is obtained by executing the radio wave propagation characteristics simulation on the basis of the area shape information F of the above described target area, the installation position information C of each wireless device 7, and the radio wave information W of each wireless device 7. The radio wave propagation characteristics simulation may be a known technique such as a ray tracing, for instance.

Figure 3:
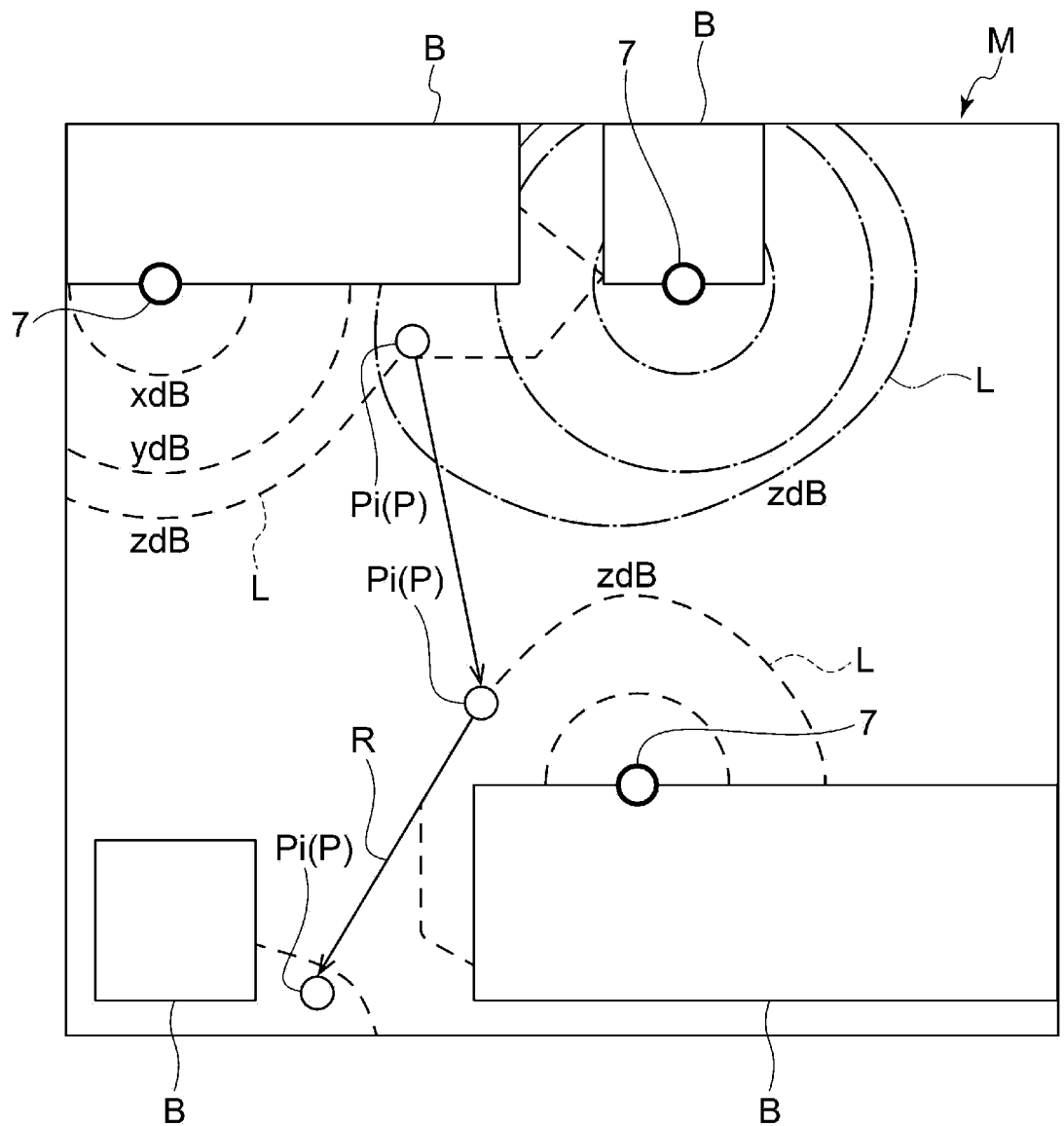
FIG. 3 is a diagram illustrating an image of the radio wave strength map of a target area according to an embodiment of the present invention.

As a result, it is possible to obtain the radio wave strength map M from which the information illustrated in FIG. 3 is obtainable. The radio wave strength map M illustrated in FIG. 3 is a 2D map of the target area as seen from above. The position in the vertical direction (gravity direction) is taken at the vertical position (height) of the on-board wireless device 81 of the mobile body 8, for instance. In the partial region of the target area corresponding to the radio wave strength map M, there are four obstacles B in total. A wireless device 7 is disposed in the vicinity of each of three of the four obstacles B (the total number of wireless devices 7 is three). The dash line and the dash-and-dot line in FIG. 3 show an analysis result obtained by radio wave propagation characteristics simulation, and the lines are connecting positions where the radio waves strength is the same (contour line). By referring to the radio wave strength map M, it is possible to estimate from which wireless device 7 the radio waves or the like received by the on-board wireless device 81 at an arbitrarily position in the target area comes from, and the level of the received signal strength indication (RSSI) at the time. While the contour line of the radio waves strength becomes smaller with distance from each wireless device 7 in the radial direction, the contour line positioned most outside among the contour lines surrounding each wireless device 7 corresponds to the limit radio wave strength to which the wireless communication with the wireless device 7 is possible, and is hereinafter referred to as the communication limit line L.

The determination part 3 is a functional part configured to determine the above described communication point P on the basis of the above radio wave strength map M obtained by the above described first acquisition part 2. With regard to the communication position Pi that defines the communication point P, any position may be determined as the communication position Pi as long as the position is inside the communication limit line L (at the side of the wireless device 7) in the radio wave strength map M. In some embodiments, the determination part 3 may determine the communication position Pi on the basis of a predetermined logic using the radio wave strength map M and other information. Specifically, the other information includes the distance to the obstacle B while the mobile body 8 is moving, or the traveling distance on the patrol route R. More specifically, the communication position Pi may be determined under a condition that the radio wave strength is not lower than a threshold, and the distance to the obstacle B is the maximum or the travel distance on the patrol route R is the minimum, for instance. The area inside the communication limit line L of each of the plurality of wireless devices 7 where the radio waves thereof overlap may be selected as the communication position Pi as a priority. The patrol route R is determined so as to pass all of the determined communication positions Pi.

Furthermore, for instance, in a case where the communication point P is determined taking into account the direction of transmission of the radio waves or the like in addition to the communication position Pi, the communication position Pi may be determined by obtaining the radio wave strength maps M corresponding to the combination of the value of the information set defining the direction of transmission, and comparing the plurality of radio wave strength maps M. More specifically, the communication point P may be determined by firstly determining the communication position Pi as a priority using a predetermined radio wave strength map M, and then other information that determines the communication point P such as the most suitable attitude of the on-board wireless device 81, the attitude of the antenna, the orientation of the antenna, and the like at the determined communication position Pi may be determined on the basis of the plurality of radio wave strength maps M, or the most suitable communication point P may be determined from the plurality of radio wave strength maps M.

In the embodiment depicted in FIG. 2, the communication point determination device 1 is disposed outside the mobile body 8. For instance, the control device 61 includes the communication point determination device 1. The above described first acquisition part 2 inputs the obtained radio wave strength map M into the determination part 3, and then the determination part 3 determines the communication point P for each of the all of the wireless devices 7 installed within the target area on the basis of the inputted radio wave strength map M.

More specifically, the communication point determination device 1 further includes a map generation part 12 for generating the radio wave strength map M, and a route determination part 4 for determining the patrol route R whereby it is possible to pass all of the communication points P determined by the determination part 3 in sequence. The route determination part 4 determines the order of passing the communication positions Pi corresponding to the respective wireless devices 7 determined by the determination part 3. The map generation part 12 is configured to generate the radio wave strength map M and store the same in the storage part 1*m* when the area shape information F, the installation position information C, and the radio wave information W are each inputted thereto. The control device 61 is configured to automatically control movement of the mobile body 8 on the basis of the patrol route R determined by the route determination part 4.

With the above configuration, the installed devices such as the plurality of sensors 9 installed within the target area of a plant or the like, for instance, are each connected to the wireless device 7 capable of sending the communication data V such as the detection result of the sensor 9 to outside. The communication point determination device 1 determines a communication point P including a communication position Pi for performing the close-range wireless communication with each wireless device 7 on the basis of the radio wave strength map M indicating the distribution of the strength of radio waves from each wireless device 7 generated taking into account the existence of the obstacle B in the target area. Accordingly, when performing close-range wireless communication with each wireless device 7 in the target area, it is possible to determine the communication point P where good communication is possible with each wireless device 7 taking into account the influence of shield, reflection, diffraction of radio waves due to the obstacle B near the wireless device 7. As described above, by obtaining a suitable communication point P for each wireless device 7 in advance, it is possible to perform stable communication with the wireless devices 7 swiftly. Thus, in a case where the detection results of the plurality of sensors 9 installed in the plant are collected through communication by moving the mobile body 8 or the like into a range of close-range wireless communication, it is possible to collect the detection results efficiently. Furthermore, it is possible to prevent a situation in which it is not possible to find a suitable communication point and collect detection results from the sensors 9.

Next, some embodiments related to the above described determination part 3 will be described with reference to FIG. 2.

In some embodiments, as depicted in FIG. 2, the above described determination part 3 may include a selection part 31 configured to select two or more (plurality of) candidate points Pc corresponding to the wireless device 7 on the basis of the radio wave strength map M, and a choosing part 32 configured to choose one of the plurality of candidate points Pc as the communication point P. The plurality of candidate points Pc may have different communication positions Pi from one another, or may be different from one another in aspects other than the communication positions Pi, or may be different from one another in at least a part of information included in the communication point P.

For instance, the selection part 31 may select, as the candidate point Pc for each wireless device 7, all positions or a part of the positions at the inner side (the side of the wireless device 7) of the communication limit line L in the radio wave strength map M. It is possible to obtain the position at the inner side (the side of the wireless device 7) of the communication limit line L of each wireless device 7 that can be selected as the candidate point Pc by obtaining the position where the radio wave strength of each wireless device 7 is not smaller than a threshold on the basis of the radio wave strength map M and extracting the position to which the mobile body 8 is movable, such as a position not overlapping with the obstacle B. Furthermore, the above part of the positions may be extracted at random, for instance, from the positions at the inner side (the side of the wireless device 7) of the communication limit line L of each wireless device 7 that can be selected as the candidate point Pc, or the positions where the distance from the wireless device 7 is not smaller than a distance threshold may be extracted.

Furthermore, the choosing part 32 may choose, from among all of the candidate points Pc selected by the selection part 31, a position most desirable according to a predetermined logic as described above as the communication point P, for instance, and determine that a position closer to the communication point P has a higher priority.

Alternatively, as depicted in FIG. 2, the communication point determination device 1 may further include a history storage part 33 configured to store communication history information H including the communication point P at which close-range wireless communication with the wireless device 7 to be communicated has succeeded. The choosing part 32 may be configured to choose the communication point P on the basis of the communication history information H. Specifically, the communication history information H may be information associating each wireless device 7 with a communication point P where the close-range wireless communication with the wireless device 7 has succeeded, or information further associating the number of success with the associated wireless device 7 (wireless device 7 to be communicated) for each communication point P. In a case where two or more most desirable communication points P are extracted as the communication points P for one of the wireless devices 7, the choosing part 32 may choose the communication point P with the most success, referring to the number of success of the communication history information H for the priority. Alternatively, the choosing part 32 may choose a candidate point Pc with a high number of success by directly using the number of success of the plurality of candidate points Pc selected by the selection part 31 as the priority.

As described above, by choosing the communication point P taking into account the success history of communication with the wireless device 7 to be communicated, it is possible to improve the probability of success of close-range wireless communication.

The communication history information H may include the communication point P where the close-range wireless communication with the wireless device 7 to be communicated has failed or the number of failure, and the communication point P may be determined taking into account the above information as well, by using the number of failure as an element for reducing the priority, for instance.

In the embodiment depicted in FIG. 2, the selection part 31 and the choosing part 32 are connected, and the plurality of candidate points Pc selected by the selection part 31 according to a predetermined logic is inputted into the choosing part 32. Furthermore, the choosing part 32 is configured to determine in advance the priority order of choosing for the plurality of candidate points Pc when the communication point P is determined for the first time, for instance, and choose a new communication point P according to the priority order of choosing. In the present embodiment, the selection part 31 determines the priority order to be determined for the communication point P when selecting the plurality of candidate points Pc, and inputs the priority order along with the plurality of candidate point Pc to the choosing part 32. Then, the choosing part 32 chooses and outputs the communication point P on the basis of the priority order.

With the above configuration, a plurality of communication points P (candidate points Pc) are determined in advance as candidates of the communication point for communication with each wireless device 7, and a new communication point P is selected from the plurality of candidate points Pc upon a failure of communication between the wireless device 7 installed in the target area and the on-board wireless device 81 of the mobile body 8. Accordingly, it is possible to appropriately determine a new communication point P swiftly.

Next, some embodiments related to the communication point determination device 1 will be described.

Figure 4:
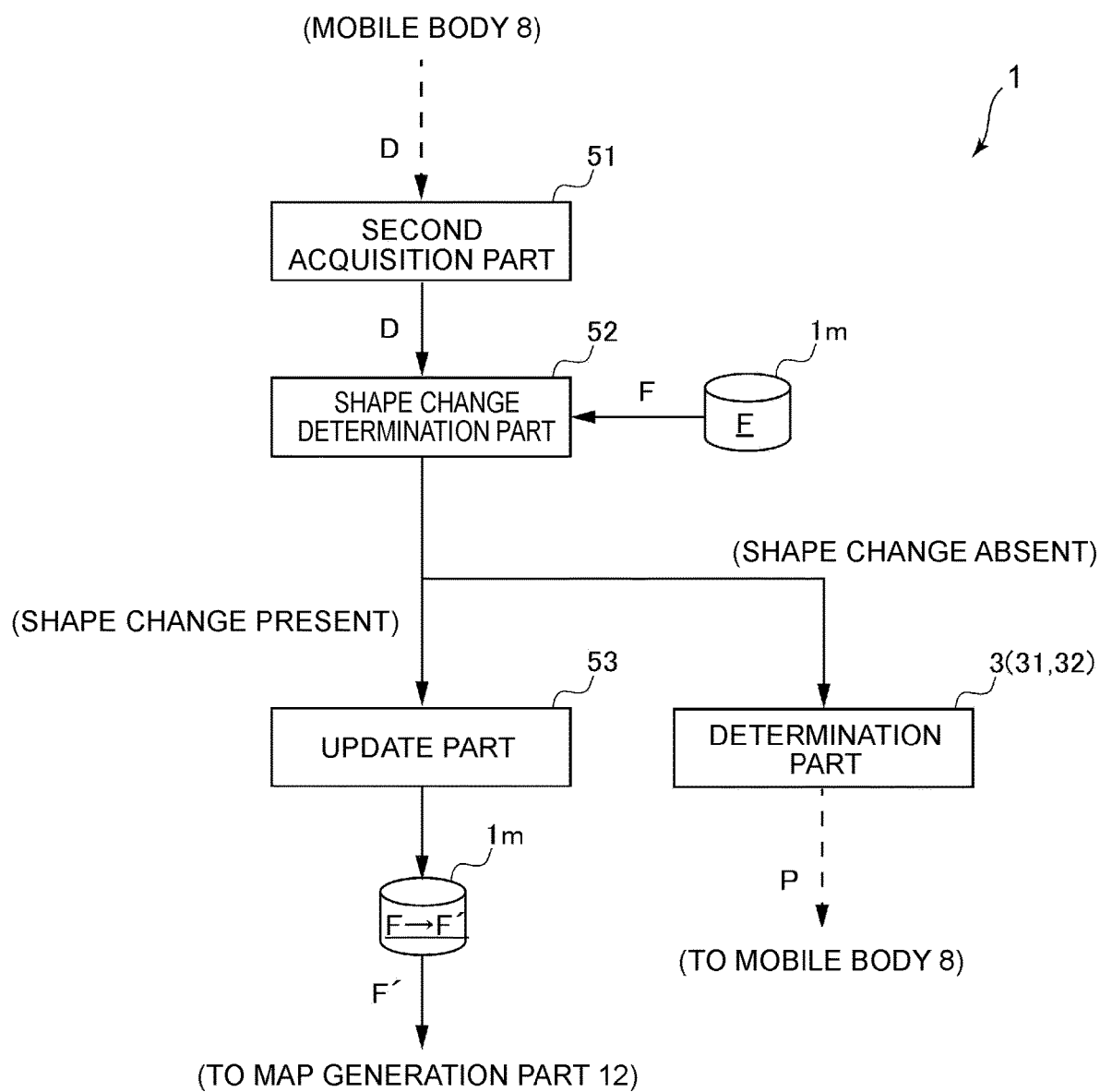
FIG. 4 is a schematic block diagram showing the functions of a communication point determination device according to an embodiment of the present invention, further including the second acquisition part, a shape change determination part, and an update part.

FIG. 4 is a schematic block diagram showing the functions of the communication point determination device 1 according to an embodiment of the present invention, further including the second acquisition part 51, a shape change determination part 52, and an update part 53. The mobile body 8 described with reference to FIG. 4 is equipped with the above described ranging sensor, and thus capable of detecting the obstacle B in the surrounding of the mobile body 8 while the mobile body 8 is moving.

For instance, even when the mobile body 8 actually moves to the communication point P determined as described above and tries to communicate with the wireless device 7 connected to the sensor 9 at the communication point P, the close-range wireless communication may fail if there is a new obstacle B that has been absent at the time of generation of the radio wave strength map M, for instance.

Thus, in some embodiments, at the time of failure of close-range wireless communication with the wireless device 7 (wireless device 7 to be communicated) which serves as a target (address) of communication at each communication point P, the above ranging sensor provided for the mobile body 8 may be used to perform a detection operation of the obstacle B included in at least a part of the direction of the surrounding of the communication point P. That is, the mobile body 8 is configured to, if the close-range wireless communication with the wireless device 7 to be communicated at the communication point P fails, detect the obstacle B included in at least a part of the direction of the surrounding of the communication point P at the time of failure, and send the detection result D (surrounding object shape information) of the obstacle B to the communication point determination device 1.

As depicted in FIG. 4, the above described communication point determination device 1 may further include the second acquisition part 51 configured to obtain the detection result D of the obstacle B obtained from the detection operation by the mobile body 8, and a shape change determination part 52 configured to determine presence or absence of shape change of the detected shape of the surrounding from the shape of the surrounding indicated by the area shape information used at the time of determination of the communication point P where the above communication has failed (hereinafter, a failure point Pf) on the basis of the detection result D of the obstacle B. In this case, if it is determined that there is shape change in the above determination, the above determination part 3 is configured to determine a new communication point P (new point Pn) instead of the above failure point Pf.

The above detection operation for the obstacle B may be autonomously performed by the mobile body 8, or may be performed in response to an order from the control device 61 after the mobile body 8 notifies the control device 61 of the failure of communication. Furthermore, the above shape change may be determined by calculating the alignment therebetween, determining that shape change is absent if the alignment is not smaller than a prescribed threshold determined in advance, and that shape change is present if the alignment is smaller than the prescribed threshold. By setting the above prescribed threshold appropriately, it is possible to prevent shape change from being determined to be present due to influence of a temporal object such as a pedestrian and a moving vehicle.

That is, in a case where the preset communication point P becomes the failure point Pf, there is a possibility that shape change has occurred between the failure point Pf and the wireless device 7 to be communicated or in the surrounding of the wireless device 7 as in appearance of a new obstacle B, for instance, and thus the obstacle B in the surrounding of the mobile body 8 is scanned. If the above shape change as in appearance of a new obstacle B has occurred as a result of the scanning, a new communication point P is determined.

More specifically, as depicted in FIG. 4, the communication point determination device 1 may further include an update part 53 configured to update (correct) the existing area shape information F on the basis of the detection result D of the obstacle B detected from the above detection operation if it is determined that shape change is present. In a case where the shape change determination part 52 determines that the above shape change is present, the above described first acquisition part 2 obtains a new radio wave strength map M obtained from the above numerical analysis based on the updated area shape information F' after update by the update part 53, the installation position information C, and the radio wave information W (see FIG. 2). The determination part 3 determines a new communication point P on the basis of the new radio wave strength map M and sends the new communication point P to the control device 61 (see FIG. 2). Accordingly, the mobile body 8 moves to the new communication point P as the communication position Pi changes. If there is a communication point P with which the mobile body 8 is able to communicate without moving, the mobile body 8 may change the state (the attitude, for instance) in accordance with such a communication point P.

On the other hand, the choosing part 32 may be configured to choose a new communication point P from among the plurality of candidate points Pc determined in advance by the determination part 3 if the shape change determination part 52 determines that the above shape change is absent. Accordingly, in a case where it is determined that the area shape information used to generate the existing radio wave strength map M is not changed upon failure of communication, it is possible to determine a new communication point P swiftly by choosing a new communication point P from among the plurality of candidate points Pc selected in advance on the basis of the existing radio wave strength map M.

Specifically, the area around the communication position Pi of the failure point Pf may be searched for another communicable communication position Pi by trial and error, or the mobile body 8 may move to the communication position Pi of the candidate point Pc chosen from communication points P selected in advance as a plurality of candidates (candidate points Pc) having different communication positions Pi for the respective wireless devices 7.

Alternatively, communication may be attempted by changing the state of the mobile body 8 in accordance with the new communication point P obtained by changing the other information (the above described attitude, for instance) included in the failure point Pf. In this case, the communication point P may be chosen from a plurality of pre-selected candidate points Pc having different information from one another except for the communication position Pi. Furthermore, the communication may be attempted before the shape change determination part 52 determines presence or absence of the above shape change, such as before the detection operation by the mobile body 8.

Furthermore, the mobile body 8 may relinquish communication with the wireless device 7 to be communicated at the failure point Pf, and move to the communication point P for communication with the next wireless device 7.

In the embodiment depicted in FIG. 4, the mobile body 8 is equipped with LiDAR, and if communication fails, the mobile body 8 uses the LiDAR to scan a part of or the entire surrounding including the direction of installation of the wireless device 7, thereby generating point group data (detection result D of the obstacle B) indicating the 3D shape of the surrounding area. Furthermore, in response to input of the point group data, the update part 53 updates the part (data) of the existing area shape information F that has shape change on the basis of the point group data. That is, the update part 53 generates new area shape information F' by reflecting the point group data (shape change) on the existing area shape information F.

More specifically, the second acquisition part 51 is connected to the shape change determination part 52, and inputs point group data obtained from communication with the mobile body 8 to the shape change determination part 52. The shape change determination part 52 is connected to the update part 53, and determines presence or absence of shape change by comparing inputted point group data to the existing area shape information F stored in the storage part 1m. As a result, if it is determined that shape change is present, the point group data is inputted to the update part 53. The update part 53 is configured to, if the point group data is inputted, overwrite the existing area shape information F of the storage part 1m with the new area shape information F' generated on the basis of the point group data and the existing area shape information F. In response, the above described map generation part 12 generates a new radio wave strength map M through the numerical analysis using the new area shape information F', and the new radio wave strength map M obtained by the first acquisition part 2 is inputted to the determination part 3, whereby a new communication point P is determined.

In a case where a new communication point P is determined, the mobile body 8 is controlled according to the new communication point P. Specifically, the mobile body 8 is controlled to move if the communication position Pi changes, and to change the state in accordance with the new communication point P if the state like the attitude changes. Then, at the new communication point P, the mobile body 8 tries close-range wireless communication with the wireless device 7 in the state of communication failure.

Furthermore, in a case where communication with the same wireless device 7 to be communicated fails for a predetermined number of time T, as in a case where the process between execution of close-range wireless communication at the above described communication point P and execution of communication at a new communication point P is repeated for a predetermined time, the mobile body 8 may relinquish communication with the wireless device 7 of communication failure and move to the next communication point P to communicate with the next wireless device 7. Alternatively, diagnose abnormality may be performed on the on-board wireless device 81 with the diagnosis device 63 and the mobile body 8 may be controlled in accordance with the result of the abnormality diagnosis.

With the above configuration, in a case where communication fails between the mobile body 8 having moved actually to the communication point P and the wireless device 7 to be communicated at the communication point P, it is determined whether the existing area shape information F (radio wave strength map M) is not changed through detection of the obstacle B in the surrounding area upon the communication failure, and a new communication point P is determined if it is determined that shape change is present. Accordingly, upon failure of communication, it is possible to swiftly provide a new communication point P where communication is likely to succeed, without trial and error as in the attempt to communicate while actually moving the mobile body 8. Thus, it is possible to ensure swift collection of communication data V like the detection results of the sensor 9 through communication with each wireless device 7.

In the above described embodiment, a new communication point P is determined upon communication failure. Nevertheless, in some other embodiments, abnormality diagnosis may be performed on the on-board wireless device 81 of the mobile body 8, and the detection operation of the obstacle B described above and the following process or movement to the next communication point P for communication with the wireless device 7 may be carried out if it is determined that abnormality is absent.

That is, in some embodiments, as depicted in FIG. 1, the inspection system 6 may further include a diagnosis device 63 configured to perform abnormality diagnosis on the on-board wireless device 81 if the number of failure of close-range wireless communication with the same wireless device 7 becomes the above predetermined number T or more. Further, the mobile body 8 may be controlled to move to a predetermined position other than the communication point P such as a hangar if the result of the abnormality diagnosis by the diagnosis device 63 shows that the on-board wireless device 81 has an abnormality.

In the embodiment depicted in FIG. 1, the diagnosis device 63 is mounted to the control device 61. More specifically, the diagnosis device 63 is a diagnosis program for causing a computer to realize diagnosis of the on-board wireless device 81. The mobile body 8 is provided with a diagnosis execution function such as a self-diagnosis function of the on-board wireless device 81, and is configured to perform self-diagnosis according to a command from the diagnosis device 63 and send the diagnosis result to the diagnosis device 63. However, the present invention is not limited to the present embodiment. It is sufficient if it is possible to diagnose the on-board wireless device 81, and any known method for enabling such diagnosis may be adopted, or the diagnosis device 63 may be mounted to the mobile body 8.

With the above configuration, in a case where communication fails due to abnormality of the on-board wireless device 81 mounted to the mobile body 8, it is possible to prevent unnecessary operation such as continuous inspection of the target area.

Furthermore, in some other embodiments, upon communication failure, before performing the above described detection operation for the obstacle B and the following processes, the attitude of the mobile body 8, the position of the on-board wireless device 81 of the mobile body 8, or the attitude of the antenna of the on-board wireless device 81, which may be included in the communication point P, may be changed. Furthermore, in a case where communication still fails even when communication is tried after changing those other than the communication position Pi, the above described detection operation of the obstacle B and the following processes may be performed, or the mobile body 8 may be moved to the next communication position Pi for communication with the next wireless device 7.

Next, the method of determining the communication point corresponding to the process of the communication point determination device 1 will be described with reference to FIGS. 5 and 6.

Figure 5:
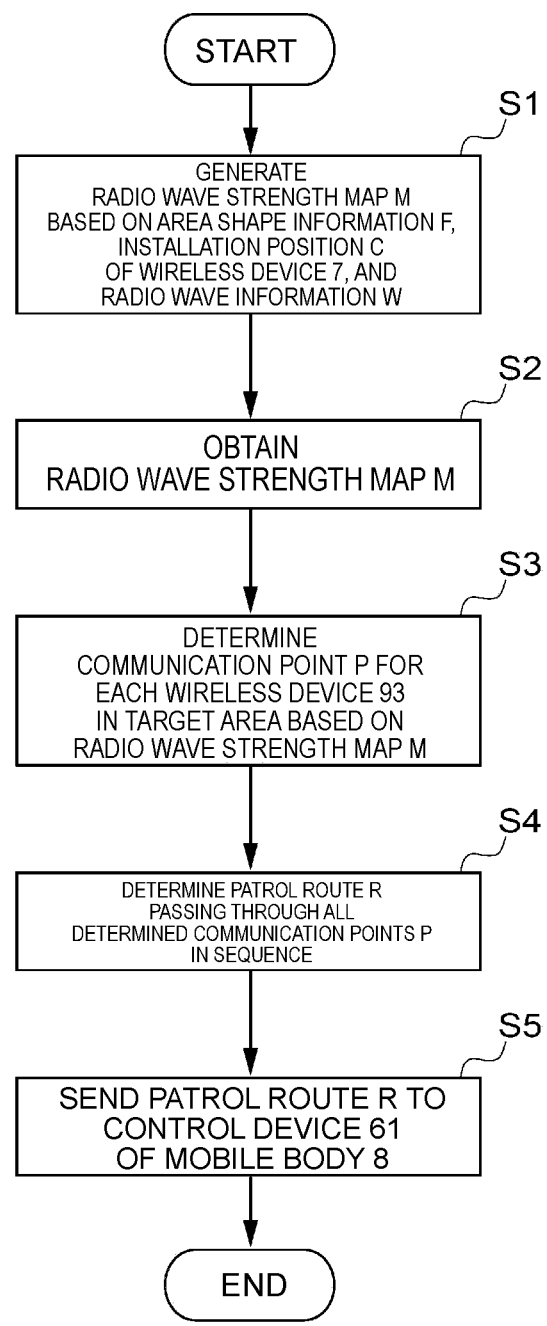
FIG. 5 is a diagram showing a method of determining a communication point according to an embodiment of the present invention.

FIG. 5 is a diagram showing the method of determining a communication point according to an embodiment of the present invention. FIG. 6 is a diagram showing the inspection method according to an embodiment of the present invention. The inspection method is provided on the premise of the patrol route R based on the communication point P determined by the method of determining the communication point, and is also used when it is necessary to determine a new communication point P.

The method of determining a communication point is a method for determining the above described communication point P corresponding to the wireless device 7 installed within the target area including the obstacle B. As depicted in FIG. 5 (also in FIG. 6), the method of determining a communication point includes a first acquisition step (S2 in FIG. 5, S7, 8 in FIG. 6) of obtaining the above described radio wave strength map M corresponding to the target area, and a determination step (S3 in FIG. 5, S7 in FIG. 6) of determining the communication point P corresponding to the above described wireless device 7 installed within the target area on the basis of the radio wave strength map M.

The above determination step may include a selection step of selecting a plurality of candidate points Pc for each wireless device 7 on the basis of the radio wave strength map M, and a choosing step of choosing one of the plurality of selected candidate points Pc as the communication point P.

The first acquisition step and the determination step are equivalent to the processes to be executed by the first acquisition part 2 and the determination part 3 described above, respectively, and thus detailed description is omitted. Furthermore, as depicted in FIG. 6, a plurality of candidate points Pc may be determined in advance by a pre-executed selection step (S0 in FIG. 6) or the like, and then a new communication point P may be determined from among the plurality of candidate points Pc in the following step S8.

Furthermore, in some embodiments, as depicted in FIG. 5 (also in FIG. 6), the method of determining the communication point may further include a map generation step (S1 in FIG. 5, S7 in FIG. 6) of generating the radio wave strength map M. In some other embodiments, the method of determining the communication point may further include a route determination step (S4 in FIG. 5) of determining the patrol route R whereby it is possible to pass all of the communication points P determined in the determination step in sequence. The map generation step and the route determination step are equivalent to the processes to be executed by the map generation part 12 and the route determination part 4 described above, respectively, and thus detailed description is omitted.

In the embodiment depicted in FIG. 5, the map generation step is executed in step S1 to generate the radio wave strength map M. The first acquisition step is executed in step S2 and the radio wave strength map M generated in the map generation step is obtained. The determination step is executed in step S3, and the communication point P corresponding to each wireless device 7 is determined by using the radio wave strength map M obtained in the first acquisition step. Then, in step S4, the route determination step is executed in step S4 to determine the patrol route R. Furthermore, in step S5, a step of sending the determined patrol route R to the control device 61 of the mobile body 8 is executed. The step 5 may be a step of storing the patrol route R to the storage part of the control device 61 so as to be available for the control device 61.

Next, the method of determining the communication point and the inspection method will be described with reference to FIG. 6.

While the inspection method may be performed at any timing, in patrol inspection of a plant, the inspection method is performed regularly, such as daily basis.

Figure 6:
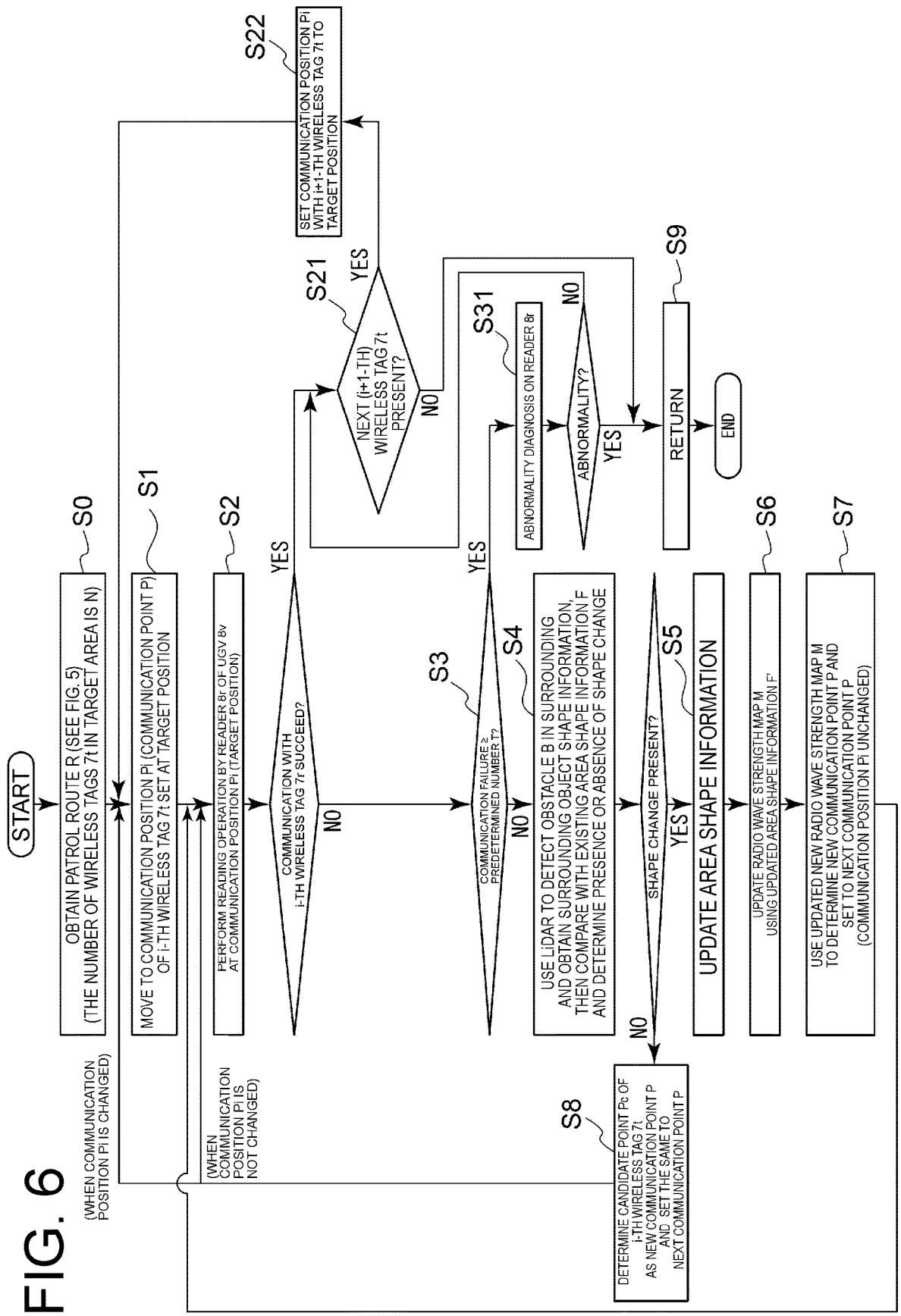
FIG. 6 is a diagram showing an inspection method according to an embodiment of the present invention.

In some embodiments, as depicted in FIG. 6, the method of determining the communication point may include a second acquisition step (S4 in FIG. 6) of obtaining the detection result D of the obstacle B included in at least a part of a direction of the surrounding of the communication point P upon communication failure of the close-range wireless communication with the wireless device 7 to be communicated at the communication point P, and a shape change determination step (S4 in FIG. 6) of determining presence or absence of shape change of the shape of the detected surrounding from the shape of the surrounding indicated by the area shape information, on the basis of the detection result D of the obstacle B obtained in the second acquisition step. In this case, the above determination step (S7, S8 in FIG. 6) determines a new communication point P instead of the above failure point Pf if it is determined that the shape change is present. The second acquisition step and the shape change determination step are equivalent to the processes to be executed by the second acquisition part 51 and the shape change determination part 52 described above, respectively, and thus detailed description is omitted.

Furthermore, in some embodiments, as depicted in FIG. 6, the method of determining the communication point may further include an update step of updating the area shape information F on the basis of the detection result D of the obstacle B. In this case, the determination step (S7 in FIG. 6) may determine the new communication point P on the basis of the new radio wave strength map M obtained by the numerical analysis using the updated area shape information F' if it is determined that the shape change is present. The update step is similar to the process to be executed by the update part 53 described above, and thus detailed description is omitted.

In some embodiments, as depicted in FIG. 6, the choosing step (S8 in FIG. 6) may choose a new communication point P from the plurality of candidate points Pc selected in advance for the failure point Pf of the communication if it is determined that the above shape change is absent in the shape change determination step.

Furthermore, in some embodiments, as depicted in FIG. 6, the inspection method may further include a diagnosis step (S31) of performing abnormality diagnosis on the on-board wireless device 81 if the number of failure of close-range wireless communication with the same wireless device 7 becomes the above predetermined number T or more (YES in S3). In this case, the method may further include a moving step (S9) of moving the mobile body 8 to a predetermined position other than the communication point P if the result of the abnormality diagnosis shows that the on-board wireless device 81 has an abnormality (YES in S32). The diagnosis step is similar to the process to be executed by the diagnosis device 63 described above, and thus detailed description is omitted.

In the embodiment depicted in FIG. 6, the number of wireless tags 7*t* (wireless devices 7) installed in the target area is N in total. When the respective wireless devices 7 are referred to as i-th (i=1, 2, . . . , N) wireless devices 7, FIG. 6 corresponds to a case where a UGV 8*v* (mobile body 8) equipped with a RFID reader/writer (on-board wireless device 81; hereinafter, merely referred to as the reader 8*r*) that has at least a reading function moves along the patrol route R while patrolling the wireless devices 7 from the 1st wireless device (i=1) to the N-th wireless device in sequence. Thus, close-range wireless communication is performed by RFID by execution of the reading operation using the reader 8r. Furthermore, the UGV 8v is equipped with a LiDAR as a ranging sensor. The above premises are merely an example. The mobile body 8, the on-board wireless device 81, and the ranging sensor in FIG. 6 may be replaced with those of desired types upon implementation.

In step S0, a patrol route R which passes through the communication positions Pi (communication points P) corresponding to all of (N) the wireless tags 7t installed in the target area determined by the method of determining the communication point (FIG. 5) is obtained. In the next step S1, the UGV 8v is moved in sequence to the communication positions Pi of the respective communication points P determined in step S0. In step S2, close-range wireless communication is performed using the reader 8r in order to communicate with the i-th wireless tag 7t to be communicated at the communication point P.

If the communication with the i-th wireless tag 7t succeeds as a result of execution of step S2, in step S21, it is checked whether the next (i+1-th) wireless tag 7t is present or absent. Specifically, it may be checked if an expression i+1≤N is satisfied. If the i+1-th wireless tag 7t is present, in step S22, the communication position Pi of the i+1-th wireless tag 7t is set to the target position, and the process returns to step S1. Conversely, if the i+1-th wireless tag 7t is absent (i+1>N) in step S22, the process advances to step S9, and the mobile body 8 returns to a hangar or the like, for instance, and the flow is completed.

Meanwhile, if communication fails in step S2 (communication failure), in step S3, it is checked whether the number of communication failure with respect to the i-th wireless tag 7t is smaller than the predetermined number T. If the number of communication failure is not smaller than the predetermined number T, abnormality analysis is performed on the reader 8r in step S31. As a result, if the reader 8r has no abnormality, the process advances to the above described S21. That is, communication with the i-th wireless tag 7t is relinquished, and control for communication with the next wireless tag 7t is performed. Conversely, if it is determined that the reader 8r has an abnormality, the above described step S9 is executed, and then the flow is completed. Furthermore, in step S3, if the number of communication failure is smaller than the predetermined number T, the process advances to step S4.

In step 4, the LiDAR mounted to the UGV 8v is used to execute detection operation of the above described obstacle B without moving from the site, and the detection result of the obstacle B obtained accordingly (surrounding object shape information) is obtained (second acquisition step), and compared to the area shape information F currently possessed, whereby it is determined whether the shape change is present or absent in the surrounding of the wireless tag 7t or between the current communication position Pi and the wireless tag 7t to be communicated (shape change determination step).

As a result, if the shape change is present, in step S5, extensive search or analysis is performed on the area with the shape change in the detection result of the obstacle B, for instance, to update the existing area shape information F, and then new area shape information F (updated area shape information F') is obtained. In step S6, radio wave propagation characteristics simulation is performed on the basis of the updated area shape information F', the installation position information C of each wireless tag 7t, and the radio wave information W of each wireless tag 7t to generate (update) the new radio wave strength map M (map generation step). In step 7, a new communication point P is determined using the new radio wave strength map M (acquisition step, determination step), and set as the next communication point P (those other than the communication position Pi are changed), and then the process returns to step S2. In this case, the new communication point P is changed except for the communication position Pi, and the reader 8r performs the reading operation at the new communication point P. Conversely, if the shape change is absent in the result of step S4, the candidate point Pc corresponding to the i-th wireless tag 7t is set as the next communication point in step S8, and the process returns to step S2. In this case, the communication position Pi may be changed in accordance with the candidate point Pc, or may remain unchanged. If changed, the UGV 8v moves to the new communication position Pi, and then the step S2 is executed. If the above described candidate point Pc is not determined in advance in step S8, the new communication point P may be determined according to some logic.

Embodiments of the present invention were described in detail above, but the present invention is not limited thereto, and various amendments and modifications may be implemented.

(Additional Note)

(1) According to at least one embodiment of the present invention, a communication point determination device (1) for determining a communication point (P) including a communication position (Pi) being a position of a mobile body (8) which performs close-range wireless communication with a wireless device (7) disposed within a target area including an obstacle (B) which obstructs propagation of radio waves includes: a first acquisition part (2) configured to obtain a radio wave strength map (M) indicating a distribution of a radio wave strength within the target area obtained by numerical analysis based on area shape information (F) of the target area generated on the basis of an outer shape of the obstacle (B) existing within the target area, installation position information (C) of the wireless device within the target area, and radio wave information (W) related to transmission or response of radio waves of the wireless device (7); and a determination part (3) configured to determine the communication point (P) on the basis of the radio wave strength map (M).

With the above configuration (1), the installed devices such as the plurality of sensors (9) installed within the target area of a plant or the like, for instance, are each connected to the wireless device (7) capable of sending the communication data (V) such as the detection result (D) of the sensors (9) to outside. The communication point determination device (1) determines a communication point (P) including a communication position (Pi) for performing the close-range wireless communication with each wireless device (7) on the basis of the radio wave strength map (M) indicating the distribution of the strength of radio waves from each wireless device (7) generated taking into account the existence of the obstacle (B) existing in the target area. Accordingly, when performing the close-range wireless communication with each wireless device (7) in the target area, it is possible to determine the communication point (P) where good communication with each wireless device (7) is possible, taking into account the influence of shield, reflection, diffraction of radio waves due to the obstacle (B) around the wireless device (7). As described above, by obtaining an appropriate communication point (P) corresponding to each wireless device (7) in advance, it is possible to perform stable communication with the wireless devices (7) swiftly.

Thus, in a case where the detection results (D) of the plurality of sensors (9) installed in the plant is collected through communication by moving the mobile body (8) or the like into a range where close-range wireless communication is possible, it is possible to collect the detection results efficiently. Furthermore, it is possible to prevent a situation in which it is not possible to find an appropriate communication point (P) and collect the detection results (D) from the sensors (9).

(2) In some embodiments, in the above configuration (1), the communication point determination device (1) further includes: a second acquisition part (51) configured to obtain a detection result (D) of the obstacle (B) included in at least a part of a direction of a surrounding of the communication point (P) upon failure of the close-range wireless communication at the communication point (P); and a shape change determination part (52) configured to determine, on the basis of the detection result (D) of the obstacle (B), presence or absence of shape change of the detected surrounding from a shape of the surrounding indicated by the area shape information (F). The determination part (3) is configured to, if it is determined that the shape change is present, determine a new communication point (P) instead of the communication point (P) at which the close-range wireless communication has failed.

With the above configuration (2), in a case where communication fails between the mobile body (8) having moved actually to the communication point (P) and the wireless device (7) to be communicated at the communication point (P), it is determined whether the existing area shape information (F) (radio wave strength map (M)) is not changed through detection of the obstacle (B) in the surrounding area upon communication failure, and a new communication point (P) is determined in a case it is determined that shape change is present. Accordingly, upon failure of communication, it is possible to swiftly provide a new communication point (P) where communication is likely to succeed, without trial and error as in the attempt to communicate while actually moving the mobile body (8). Thus, it is possible to ensure swift collection of the communication data (V) like the detection results (D) of the sensor (9) through communication with each wireless device (7).

(3) In some embodiments, in the above configuration (2), the communication point determination device (1) further includes an update part (53) configured to update the area shape information (F) on the basis of the detection result (D) of the obstacle (B). The determination part (3) is configured to, if it is determined that the shape change is present, determine the new communication point (P) on the basis of a new radio wave strength map (M) obtained by the numerical analysis using the updated area shape information (F).

With the above configuration (3), upon communication failure, if it is determined that the area shape information (F) used to generated the radio wave strength map (M) is not effective, the area shape information (F) is updated on the basis of the detection result (D) of the obstacle (B) in the surrounding at the time of communication failure, and the new communication point (P) is determined on the basis of the new radio wave strength map (M) obtained by regenerating the radio wave strength map (M) using the updated area shape information (F). Accordingly, it is possible to provide the new communication point (P) where communication with the wireless device (7) to be communicated is possible, without searching for the same by trial and error as in the attempt to communicate while actually moving the mobile body (8), for instance.

(4) In some embodiments, in any one of the above configurations (2) to (3), the determination part (3) includes: a selection part (31) configured to select a plurality of candidate points (Pc) for the wireless device (7) on the basis of the radio wave strength map (M); and a choosing part (32) configured to choose one of the plurality of candidate points (Pc) as the communication point (P), and the choosing part (32) is configured to, if the shape change determination part (52) determines that the shape change is absent, choose the new communication point (P) from the plurality of candidate points (Pc).

With the above configuration (4), in a case where it is determined that the area shape information (F) used to generate the existing radio wave strength map (M) is not changed upon failure of communication, a new communication point (P) is chosen from among the plurality of candidate points (Pc) selected in advance on the basis of the existing radio wave strength map (M). Accordingly, it is possible to appropriately determine a new communication point (P) swiftly.

(5) In some embodiments, in the above configuration (4), the communication point determination device (1) further includes a storage part (1*m*) for storing communication history information (H) including the communication point (P) at which the close-range wireless communication has succeeded, and the choosing part (32) is configured to choose the communication point (P) on the basis of the communication history information (H).

With the above configuration (5), by choosing the communication point (P) taking into account the success history of communication with the wireless device (7) to be communicated, it is possible to improve the probability of success of the close-range wireless communication.

(6) In some embodiments, in any one of the above configurations (1) to (5), the communication point (P) is determined by at least one information of the communication position (Pi) within the target area, an attitude of the mobile body (8) performing the close-range wireless communication with the wireless device (7), a position of an on-board wireless device (81) of the mobile body (8) for performing the close-range wireless communication with the wireless device (7), an attitude of an antenna of the on-board wireless device (81), or an orientation of the antenna.

With the above configuration (6), the communication point (P) is defined (identified) with other information which affects the quality of wireless communication with the wireless device (7) in addition to the position information. Accordingly, it is possible to change the communication point (P) without changing the position to perform communication.

(7) According to at least one embodiment of the present invention, an inspection system (6) includes: the communication point determination device (1) according to any one of the above (1) to (6) configured to determine a communication point (P) including a communication position (Pi) being a position of a mobile body (8) which performs close-range wireless communication with a wireless device (7) disposed within a target area including an obstacle (B) which obstructs propagation of radio waves; and the mobile body (8) including an on-board wireless device (81) for performing the close-range wireless communication with the wireless device (7), the mobile body (8) being configured to travel along a patrol route (R) which passes through the determined communication position (Pi).

With the above configuration (7), the plurality of sensors (9) installed within the target area of a plant or the like, for instance, are each connected to the wireless device (7) capable of sending the detection result (D) of the sensor (9) to outside. In the inspection system (6), the mobile body (8) patrols, in sequence, the communication points (P) where it is possible to perform close-range wireless communication with the respective wireless devices (7), while collecting the detection result (D) of each sensor (9) through close-range wireless communication with each wireless device (7). The above communication point (P) is determined in advance taking into account the influence of the obstacle (B) that obstructs propagation of radio waves within the target area as described above, and exerts the same effect as the above (1) to (5).

(8) In some embodiments, in the above configuration (7), the inspection system (6) further includes a control device (61) configured to control the mobile body (8). The mobile body (8) is configured to, if the close-range wireless communication at the communication point (P) fails, detect the obstacle (B) included in at least a part of a direction of a surrounding of the communication point (P) and send a detection result (D) of the obstacle (B) to the communication point determination device (1), and the control device (61) is configured to, if the communication point determination device (1) determines a new communication point (P) in response to receiving the detection result (D) of the obstacle (B), control the mobile body (8) to the new communication point (P).

With the above configuration (8), upon communication failure at the communication point (P), the obstacle (B) in the surrounding of the communication point (P) is detected, and the detection result is sent to the communication point determination device (1). Accordingly, upon failure of communication, it is possible to swiftly provide a new communication point (P) where communication is likely to succeed, without trial and error as in the attempt to communicate while actually moving the mobile body (8). Thus, similarly to the above (2), it is possible to ensure swift collection of communication data (V) like the detection results (D) of the sensor (9) through communication with each wireless device (7).

(9) In some embodiments, in any one of the above configuration (7) or (8), the inspection system (6) further includes a diagnosis device (63) configured to, if the number of failure of the close-range wireless communication with the same wireless device (7) becomes a predetermined number (T) or more, perform abnormality diagnosis on the on-board wireless device (81), and the mobile body (8) is configured to, if a result of the abnormality diagnosis shows that the on-board wireless device (81) has an abnormality, travel to a predetermined position other than the communication point (P).

With the above configuration (9), if the number of failure of communication with the same wireless device (7) becomes the predetermined number (T) or more, abnormality diagnosis is performed on the on-board wireless device (81) mounted to the mobile body (8), and if there is an abnormality, the mobile body (8) is returned to a hanger of the mobile body (8) or the like, for instance. Accordingly, in a case where communication fails due to an abnormality of the on-board wireless device (81) mounted to the mobile body (8), it is possible to prevent unnecessary operation such as continuous inspection of the target area.

(10) According to at least one embodiment of the present invention, a method for determining a communication point (P) which includes a communication position (Pi) being a position of a mobile body (8) which performs close-range wireless communication with a wireless device (7) disposed within a target area including an obstacle (B) which obstructs propagation of radio waves includes: a step of obtaining a radio wave strength map (M) indicating a distribution of a radio wave strength within the target area obtained by numerical analysis based on area shape information (F) of the target area generated on the basis of an outer shape of the obstacle existing within the target area, installation position information (C) of the wireless device (7) within the target area, and radio wave information (W) related to transmission or response of radio waves of the wireless device (7); and a step of determining the communication point (P) on the basis of the radio wave strength map (M).

With the above configuration (10), it is possible to achieve the same effect as the above (1).

(11) According to at least one embodiment of the present invention, a communication point determination program (10) is a program for determining a communication point (P) including a communication position (Pi) being a position of a mobile body (8) which performs close-range wireless communication with a wireless device (7) disposed within a target area including an obstacle (B) which obstructs propagation of radio waves, the program being configured to cause a computer to realize: a first acquisition part (2) configured to obtain a radio wave strength map (M) indicating a distribution of a radio wave strength within the target area obtained by numerical analysis based on area shape information (F) of the target area generated on the basis of an outer shape of the obstacle (B) existing within the target area, installation position information (C) of the wireless device (7) within the target area, and radio wave information (W) related to transmission or response of radio waves of the wireless device (7); and a determination part (3) configured to determine the communication point (P) on the basis of the radio wave strength map (M).

With the above configuration (11), it is possible to achieve the same effect as the above (1).

REFERENCE SIGNS LIST

1 Communication point determination device
1p Processor
1m Storage part
10 Communication point determination program
12 Map generation part
2 First acquisition part
3 Determination part
31 Selection part
32 Choosing part
33 History storage part
4 Route determination part
51 Second acquisition part
52 Shape change determination part
53 Update part
6 Inspection system
61 Control device
63 Diagnosis device 7 Wireless device
7t Wireless tag
8 Mobile body
8v UGV
81 On-board wireless device
8r Reader (RFID reader/writer)
9 Sensor
9b Base station (wireless base unit)
92 Converter
B Obstacle
C Installation position information
D Detection result
F Area shape information
F' Updated area shape information
H Communication history information
L Communication limit line
M Radio wave strength map
N Communication network
P Communication point
Pc Candidate point
Pf Failure point
Pi Communication position
R Patrol route
T Predetermined number
V Communication data
W Radio wave information

The invention claimed is:

1. A communication point determination device for determining a communication point including a communication position being a position of a mobile body which performs close-range wireless communication with a wireless device disposed within a target area including an obstacle which obstructs propagation of radio waves, the communication point determination device comprising:
a processor, which receives commands from a computer program stored on a non-transitory computer readable medium, configured to operate:
a first acquisition part configured to obtain a radio wave strength map indicating a distribution of a radio wave strength within the target area obtained by numerical analysis based on area shape information of the target area generated on the basis of an outer shape of the obstacle existing within the target area, installation position information of the wireless device within the target area, and radio wave information related to transmission or response of radio waves of the wireless device;
a determination part configured to determine the communication point on the basis of the radio wave strength map;
a second acquisition part configured to obtain a detection result of the obstacle included in at least a part of a direction of a surrounding of the communication point upon failure of the close-range wireless communication at the communication point; and
a shape change determination part configured to determine, on the basis of the detection result of the obstacle, presence or absence of shape change of the detected surrounding from a shape of the surrounding indicated by the area shape information,
wherein the determination part is configured to, if it is determined that the shape change is present, determine a new communication point instead of the communication point at which the close-range wireless communication has failed.

2. The communication point determination device according to claim 1, further comprising:
an update part configured to update the area shape information on the basis of the detection result of the obstacle,
wherein the determination part is configured to, if it is determined that the shape change is present, determine the new communication point on the basis of a new radio wave strength map obtained by the numerical analysis using the updated area shape information.

3. The communication point determination device according to claim 1,
wherein the determination part includes:
a selection part configured to select a plurality of candidate points for the wireless device on the basis of the radio wave strength map; and
a choosing part configured to choose one of the plurality of candidate points as the communication point,
wherein the choosing part is configured to, if the shape change determination part determines that the shape change is absent, choose the new communication point from the plurality of candidate points.

4. The communication point determination device according to claim 3, further comprising:
a memory that stores communication history information including the communication point at which the close-range wireless communication has succeeded,
wherein the choosing part is configured to choose the communication point on the basis of the communication history information.

5. The communication point determination device according to claim 1,
wherein the communication point is determined by at least one information of the communication position within the target area, an attitude of the mobile body performing the close-range wireless communication with the wireless device, a position of an on-board wireless device of the mobile body for performing the close-range wireless communication with the wireless device, an attitude of an antenna of the on-board wireless device, or an orientation of the antenna.

6. An inspection system, comprising:
the communication point determination device according to claim 1 configured to determine a communication point including a communication position being a position of a mobile body which performs close-range wireless communication with a wireless device disposed within a target area including an obstacle which obstructs propagation of radio waves; and
the mobile body including an on-board wireless device for performing the close-range wireless communication with the wireless device, the mobile body being configured to travel along a patrol route which passes through the determined communication position.

7. The inspection system according to claim 6, further comprising:
a control device configured to control the mobile body,
wherein the mobile body is configured to, if the close-range wireless communication at the communication point fails, detect the obstacle included in at least a part of a direction of a surrounding of the communication point and send a detection result of the obstacle to the communication point determination device, and
wherein the control device is configured to, if the communication point determination device determines a new communication point in response to receiving the detection result of the obstacle, control the mobile body to the new communication point.

8. The inspection system according to claim 6, further comprising:
- a diagnosis device configured to, if the number of failure of the close-range wireless communication with the same wireless device becomes a predetermined number or more, perform abnormality diagnosis on the on-board wireless device,
- wherein the mobile body is configured to, if a result of the abnormality diagnosis shows that the on-board wireless device has an abnormality, travel to a predetermined position other than the communication point.

9. A method for determining a communication point which includes a communication position being a position of a mobile body which performs close-range wireless communication with a wireless device disposed within a target area including an obstacle which obstructs propagation of radio waves, the method comprising:
- a step of obtaining a radio wave strength map indicating a distribution of a radio wave strength within the target area obtained by numerical analysis based on area shape information of the target area generated on the basis of an outer shape of the obstacle existing within the target area, installation position information of the wireless device within the target area, and radio wave information related to transmission or response of radio waves of the wireless device;
- a step of determining the communication point on the basis of the radio wave strength map;
- a step of obtaining a detection result of the obstacle included in at least a part of a direction of a surrounding of the communication point upon failure of the close-range wireless communication at the communication point; and
- a step of determining, on the basis of the detection result of the obstacle, presence or absence of shape change of the detected surrounding from a shape of the surrounding indicated by the area shape information,
- wherein the step of determining the communication point includes, if it is determined that the shape change is present, determine a new communication point instead of the communication point at which the close-range wireless communication has failed.

10. A program for determining a communication point including a communication position being a position of a mobile body which performs close-range wireless communication with a wireless device disposed within a target area including an obstacle which obstructs propagation of radio waves, the program being configured to cause a computer to realize:
- a first acquisition part configured to obtain a radio wave strength map indicating a distribution of a radio wave strength within the target area obtained by numerical analysis based on area shape information of the target area generated on the basis of an outer shape of the obstacle existing within the target area, installation position information of the wireless device within the target area, and radio wave information related to transmission or response of radio waves of the wireless device;
- a determination part configured to determine the communication point on the basis of the radio wave strength map;
- a second acquisition part configured to obtain a detection result of the obstacle included in at least a part of a direction of a surrounding of the communication point upon failure of the close-range wireless communication at the communication point; and
- a shape change determination part configured to determine, on the basis of the detection result of the obstacle, presence or absence of shape change of the detected surrounding from a shape of the surrounding indicated by the area shape information,
- wherein the determination part is configured to, if it is determined that the shape change is present, determine a new communication point instead of the communication point at which the close-range wireless communication has failed.

\* \* \* \* \*